(12) United States Patent
Yalovsky et al.

(10) Patent No.: US 7,752,561 B2
(45) Date of Patent: Jul. 6, 2010

(54) METHOD AND SYSTEM FOR CREATING TEMPORARY VISUAL INDICIA

(75) Inventors: Mark Yalovsky, Seattle, WA (US); Simon P. Clarke, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 666 days.

(21) Appl. No.: 11/083,135

(22) Filed: Mar. 15, 2005

(65) Prior Publication Data

US 2006/0212813 A1 Sep. 21, 2006

(51) Int. Cl.
*G06F 3/048* (2006.01)
*G06F 3/00* (2006.01)

(52) U.S. Cl. ........................... 715/764; 715/751
(58) Field of Classification Search ............ 715/764, 715/751
See application file for complete search history.

(56) References Cited

U.S. PATENT DOCUMENTS

| | | | |
|---|---|---|---|
| 5,272,470 A * | 12/1993 | Zetts | 345/173 |
| 6,233,600 B1 * | 5/2001 | Salas et al. | 709/201 |
| 6,292,857 B1 * | 9/2001 | Sidoroff et al. | 710/54 |
| 6,342,906 B1 * | 1/2002 | Kumar et al. | 715/751 |
| 7,136,048 B2 * | 11/2006 | Yrjanainen et al. | 345/173 |
| 2003/0156099 A1 * | 8/2003 | Yrjanainen et al. | 345/173 |
| 2007/0097084 A1 * | 5/2007 | Niijima | 345/173 |

* cited by examiner

*Primary Examiner*—Doug Hutton
*Assistant Examiner*—Soumya Dasgupta
(74) *Attorney, Agent, or Firm*—Merchant & Gould PC

(57) ABSTRACT

The present invention relates to new and improved embodiments of systems and methods for using a "pen" input as a temporary pointer to highlight a portion of a document and having the "ink" disappear. In embodiments, a method and system for temporarily marking a portion of a document comprises sending a marking directive that produces a visual indicia on a document being viewed on two or more display devices connected over a network, waiting a period of time, and automatically erasing the visual indicia on the document being viewed on the two or more display devices.

16 Claims, 5 Drawing Sheets

METHOD AND SYSTEM FOR CREATING TEMPORARY VISUAL INDICIA

TECHNICAL FIELD

The present invention relates generally to the creation and editing of graphical presentations. More particularly, the present invention relates to temporarily highlighting information in computer application documents.

BACKGROUND OF THE INVENTION

Computer networks, and especially the Internet, have allowed people to use computer systems to communicate data. One way in which computer systems communicate data is by sending documents electronically. Some software applications have allowed computer systems to transfer documents or other data quickly. With the fast transfers of data, people can interact in near real-time to data or documents being shared between two or more computer systems. An example of these near real-time interactions occurs in web meetings where two or more users in distant areas interact with and react to data transferred between their computers. In some web meetings, users also discuss the data over the phone while exchanging the electronic data between the computer systems.

Unfortunately, it is very difficult in many situations to focus on a portion or piece of data that is being viewed on the two or more remote computer systems. The web meetings are not in person, and normal human interactions such as pointing to, gesturing to, or drawing on a physical document are not possible. Thus, users generally must permanently alter the document during a web meeting and send the edits to the participants to highlight or draw the attention of the participants to a certain portion of the document. The edits "dirty" the document by permanently changing the documents format or appearance. Either after the meeting or later in the meeting users are forced to methodically erase the edits used to "highlight" portions of the document. The "dirtying" of documents does not fairly duplicate the normal human interaction and wastes time in undoing the edits. It is with respect to these and other considerations that the present invention has been made.

SUMMARY OF THE INVENTION

The present invention relates to new and improved embodiments of systems and methods for using visual indicia to highlight a portion of a document and having the visual indicia automatically disappear. In one embodiment, a method for temporarily marking a portion of a document comprises sending a marking directive that produces a visual indicia on a document being viewed on two or more display devices connected over a network, waiting a period of time, and automatically erasing the visual indicia on the document being viewed on the two or more display devices.

In another embodiment of the present invention, a system comprises a user interface for providing temporary visual indicia. The user interface interaction comprises receiving, within a document, an edit to the document that creates the visual indicia, displaying the visual indicia in the document, waiting a period of time, and automatically erasing the visual indicia from the document.

In still another embodiment of the present invention, a system comprises components for generating temporary visual indicia on a document viewed on two display devices. The components comprise a marking component that produces a marking directive upon input by a user and sends the marking directive to the display devices to create the visual indicia, a clock component that counts for a period of time, and an erasing component that erases the visual indicia in response to the clock component reaching the period of time.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detailed description of exemplary embodiments of the invention, and to the appended claims.

DETAILED DESCRIPTION OF THE INVENTION

The present invention will now be described more fully hereinafter with reference to the accompanying drawings, in which embodiments of the invention are shown. The invention may however, be embodied in many different forms and should not be construed as limited to the embodiments set forth herein. Rather, these embodiments are provided so that the disclosure will be thorough and complete and will fully convey the scope of the invention to those skilled in the art.

Figure 1:
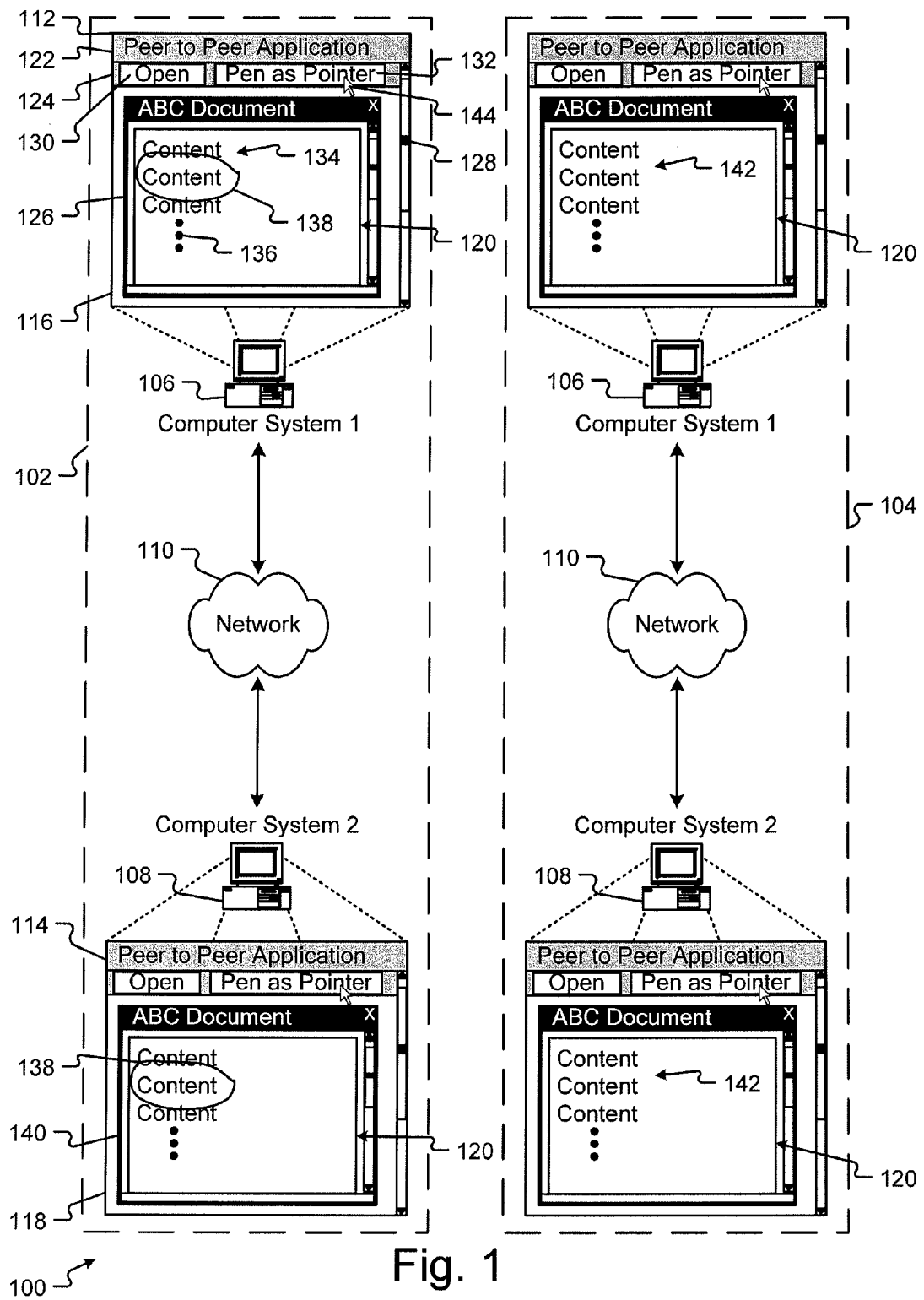
FIG. 1 is an exemplary embodiment of a peer-to-peer computer system with corresponding user interfaces for generating a temporary visual indicia onto a document displayed by two or more display devices connected to a network according to the present invention.

An exemplary peer-to-peer computer system 100 that generates a temporary visual indicia is shown in FIG. 1. It should be noted that the present invention is explained as employed in a peer-to-peer computer system. However, as one skilled in the art, the present invention may be employed in other computer architectures and is not limited to the embodiments set forth herein. As used herein, a "computer system" shall be construed broadly and is defined as "one or more devices or machines that execute programs for displaying and manipulating text, graphics, symbols, audio, video, and/or numbers." The peer-to-peer computer system 100 shows the peer-to-peer system 102 at a first time and the same peer-to-peer system 104 at a second, later time. The peer-to-peer system 102 consists of at least two computer systems 106 and 108 connected by a network 110. Any number of computer systems may be connected together in embodiments of the present invention, but, for ease of explanation, the embodiments shown will have only two computer systems 106 and 108 connected together. A network 110 is any group of computers and associated devices that are connected by communication facilities. The network 110 can be any intranet or internet, such as the Internet or the World Wide Web. In one embodiment, the connection between the computer systems 106 and 108 is facilitated by a communication software application, such as the DirectPlay® application programming interface offered by Microsoft® Corporation of Redmond, Wash., that allows the near real-time sharing of documents or data between the two or more connected computer systems 106 and 108.

The computer systems 106 and 108 display information on a display device, such as display screen 112 and/or 114. The display screen 112 is enlarged to show details of the display. In embodiments of the present invention, the display 112 and/or 114 relates to a peer-to-peer application 116 and/or 118, such as Microsoft® OneNote® note-taking program offered by Microsoft® Corporation of Redmond, Wash. The peer-to-peer application can be any program that can broadcast data to other computers over a network. In one embodiment, the peer-to-peer application is a web meeting software application. In embodiments of the present invention, the peer-to-peer applications 116 and 118 jointly display the same document 120. The document 120 is a container for any type of information, such as a text document, a graphics document, a spreadsheet document, etc. Importantly, although the peer-to-peer applications 116 and 118 display a document 120, many other types of content may be managed and displayed in accordance with the present invention, and thus, the document example is not meant as a limitation but merely as an illustration.

In the example shown in FIG. 1, the peer-to-peer application 116 has a title bar 122, a tool bar 124, and document window 126. There may be other windows for managing other information as indicated by scroll bar 128. Tool bar 124 provides user controls such as an open control 130 and a "pen as pointer" control 132, among potentially many others. Such user interface controls are generally known in the art and are useful in managing certain types of information.

Within document window 126, there is a set of content, such as content 134. In this particular example, document window 126 displays content 134 for the ABC Document. The document may have more content than that shown as represented by the ellipses 136. In addition to the content 134, the document window 126 displays visual indicia 138. In embodiments of the present invention, visual indicia 138 is any type of visual display in the document 120 that can draw the attention of a user to the content 134 highlighted by the visual indicia 138. In particular embodiments, the visual indicia 138 is a mark created with a "pen" utility, as shown by visual indicia 138. Other visual indicia 138 can comprise "highlighting," font changes, graphic components, special text or writing, or other editing that a user can produce with the user interface. The visual indicia 138 is shared with the other computer systems in the peer-to-peer system 102. As such, document window 140 also displays the visual indicia 138. The visual indicia 138 is created on both display windows 126 and 140 shortly after a user creates the visual indicia 138 in the ABC document 120.

In order to create the visual indicia 138, a user may select, with a cursor 144, the "Pen as Pointer" control 132. The "Pen as Pointer" control 132, in embodiments, transforms any edit action in the document 120 into a marking action. The marking action is then sent to other computer systems, such as computer system 108. The application window 126 and the visual indicia 138 will be discussed in more detail below, but in general, the visual indicia 138 displays a temporary mark in all documents connected to the peer-to-peer system 102. After a period of time, the peer-to-peer system 104 automatically erases the visual indicia 138, and the content 142 is displayed without the visual indicia 138 in the document 120. Thus, the computer system 100 provides temporary visual indicia similar to "disappearing ink." The computer system 100 provides advantages because a document 120 is not needlessly "dirtied" or altered to draw the attention of the users temporarily to some portion of the document 120. Rather, the temporary visual indicia 138 marks a document 120 to direct a user's attention and then will automatically erase or disappear after a period of time.

Figure 2:
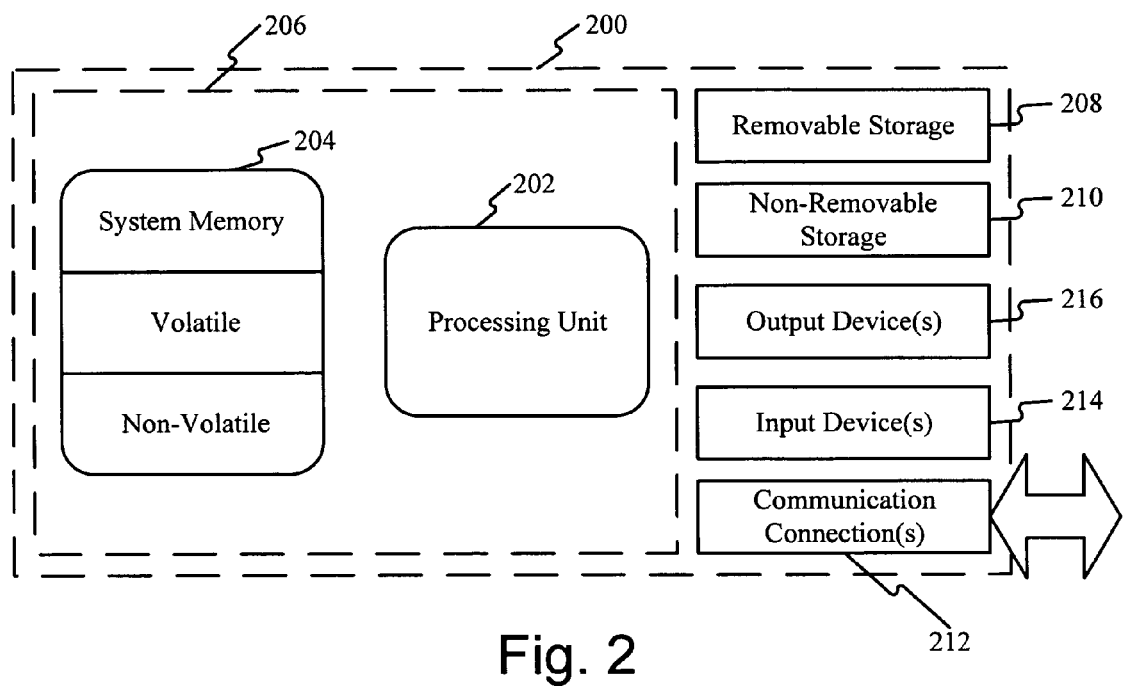
FIG. 2 is a functional diagram illustrating a computing environment and a basic computing device that can operate in the peer-to-peer computer system according to the present invention.

An example of a suitable operating environment in which the invention may be implemented is illustrated in FIG. 2. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 2, an exemplary system for implementing the invention includes a computing device, such as computing device 200. In its most basic configuration, computing device 200 typically includes at least one processing unit 202 and memory 204. Depending on the exact configuration and type of computing device, memory 204 may be volatile (such as RAM), non-volatile (such as ROM, flash memory, etc.), or some combination of the two. The most basic configuration of the computing device 200 is illustrated in FIG. 2 by dashed line 206. Additionally, device 200 may also have additional features or functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information, such as computer readable instructions, data structures, program modules, or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 200. Any such computer storage media may be part of device 200.

Device 200 may also contain communications connection(s) 212 that allow the device to communicate with other devices. Communications connection(s) 212 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

Device 200 may also have input device(s) 214 such as keyboard, mouse, pen, voice input device, touch input device, etc. Output device(s) 216 such as a display, speakers, printer, etc. may also be included. The devices 214 may help form the user interface 102 discussed above while devices 216 may display results 108 discussed above. All these devices are well know in the art and need not be discussed at length here.

Computing device 200 typically includes at least some form of computer readable media. Computer readable media can be any available media that can be accessed by processing unit 202. By way of example, and not limitation, computer readable media may comprise computer storage media and communication media. Combinations of the any of the above should also be included within the scope of computer readable media.

The computer device 200 may operate in a networked environment using logical connections to one or more remote computers (not shown). The remote computer may be a personal computer, a server computer system, a router, a network PC, a peer device, or other common network node, and typically includes many or all of the elements described above relative to the computer device 200. The logical connections between the computer device 200 and the remote computer may include a local area network (LAN) or a wide area network (WAN), but may also include other networks. Such networking environments are commonplace in offices, enterprise-wide computer networks, intranets, and the Internet.

When used in a LAN networking environment, the computer device 200 is connected to the LAN through a network interface or adapter. When used in a WAN networking environment, the computer device 200 typically includes a modem or other means for establishing communications over the WAN, such as the Internet. The modem, which may be internal or external, may be connected to the computer processor 202 via the communication connections 212, or other appropriate mechanism. In a networked environment, program modules or portions thereof may be stored in the remote memory storage device. By way of example, and not limitation, a remote application programs may reside on memory device connected to the remote computer system. It will be appreciated that the network connections explained are exemplary and other means of establishing a communications link between the computers may be used.

Figure 3:
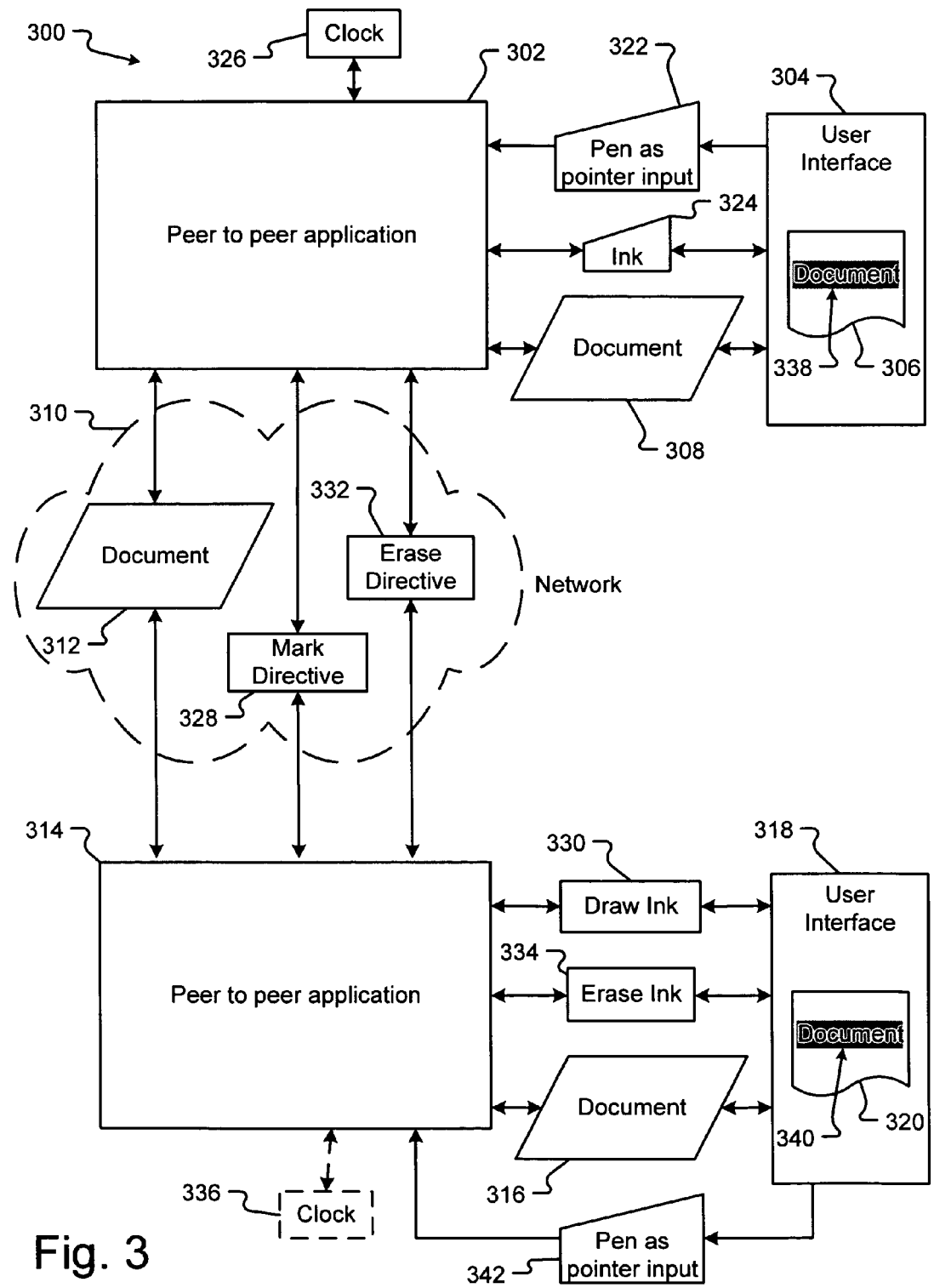
FIG. 3 is an exemplary embodiment of a peer-to-peer computer system for sending marking directives and automatically erasing visual indicia on a document displayed by two or more display devices connected to a network according to the present invention.

An exemplary system 300 with components for generating temporary visual indicia on two or more display devices is shown in FIG. 3. In embodiments of the present invention, a network 310 connects two or more peer-to-peer applications, such as peer-to-peer applications 302 and 314. For ease of illustration and description, FIG. 3 shows only two peer-to-peer applications 302 and 314 connected by the network 310. The first peer-to-peer application 302 comprises a user interface 304. A user interface may be any interface that can receive or provide information to a user. In some embodiments, the user interface is a graphical user interface that displays content on a display device. A user opens or generates a document 306 that is displayed in the user interface 304.

The user of the first peer-to-peer application 302 establishes a "meeting" with the other user of the second peer-to-peer application 314. Establishing a "meeting" in such a system is explained in U.S. patent application Ser. No. 10/920,640, filed Aug. 18, 2004, and assigned to Microsoft® Corporation, which is incorporated by reference herein in its entirety. Upon establishing the "meeting," the user issues a directive to share the document 306. The document 308 is transferred to the peer-to-peer application 302 to send to the other user. In embodiments, the peer-to-peer application 302 broadcasts the document 312 over the network 310. The second peer-to-peer application 314 receives the document 312 and sends the document 316 to the second user's user interface 318. The document 320 is then displayed in the user interface 316. The system 300 allows two or more people to view the same document simultaneously.

In communicating information about the document 306, the user may desire to highlight or draw attention to a certain portion of the document 306. For example, in a web meeting, a user may wish to discuss only a small portion of the shared document 306. However, the user may be unable to effectively direct, to the appropriate portion of the document 306, the other user viewing the document 320 on a remotely connected computer 314. Essentially, the user cannot provide a physical gesture or action that directs the other user's attention. Thus, the user needs to use a tool in the web meeting to draw the other user's attention to the correct portion of the document 306.

In some embodiments, the user informs the peer-to-peer application 302 that a future edit, to the document 306, should generate temporary visual indicia. In one embodiment, the user sends a "Pen as Pointer" input control signal 322. For example, the user selects a "Pen as Pointer" control, such as control 132, which sends the directive or control signal 322 to the peer-to-peer application 302. The peer-to-peer application 302 changes the state of one or more editing devices within the user interface 304 to input temporary visual indicia. For example, some programs have a pen input that allows a user to draw lines with the mouse cursor in the user interface 304. The peer-to-peer application 302 recognizes the "pen" input as an input for temporary visual indicia after receiving the "Pen as Pointer" 322. Other inputs may be the "highlighting" function that creates a colored background behind text, as seen in document 306 shown in FIG. 3, or a graphic input that place a graphic component, such as a red circle, over a portion of the document 306. One skilled in the art will recognize other editing functions that may provide temporary visual indicia in accordance with aspects of the present invention. Alternatively, the application may be placed in a temporary edit mode, during which all edits are drawn in a temporary manner, as described below, until the application is taken out of the temporary edit mode.

The user then enters an edit into the document 306 to create visual indicia 338, such as a grey highlight shown in document 306 in FIG. 3. In embodiments of the present invention, the edit creates an "ink" directive 324 to the peer-to-peer application 302. In response to the "ink" directive 324, the peer-to-peer application completes-several actions. In one embodiment, the peer-to-peer application broadcasts a mark directive 328 over the network 310 to all other peer-to-peer applications 314. The mark directive 328 includes all information to render the visual indicia 338, created by the edit in the document 306, on the second user's user interface 318. The peer-to-peer application 314 receives the mark directive 328 and translates the mark directive 328 into a draw ink function 330 that is sent to the user interface 318. As shown in FIG. 3, the document 320 also displays visual indicia 340 as a highlight to the text similar to document 306 corresponding to the mark directive 328 and the draw ink function 330.

In one embodiment, peer-to-peer application 302 also starts a timer 326 and, upon completion of a predetermined period of time, automatically erases the visual indicia. In one embodiment, the clock 326 counts for 10 seconds. Upon reaching the end of the predetermined period of time, the clock 326, in one embodiment, sends an interrupt or notice to the peer-to-peer application 302 that the predetermined period of time has elapsed. In another embodiment, the peer-to-peer application 302 polls a clock 326 and determines if the predetermined time has elapsed.

In response to the clock 326 reaching the end of the predetermined period of time, the peer-to-peer application 302 sends an erase ink function 324 to the user interface 304 that erases the visual indicia 338 from the document 306. In a further embodiment, the peer-to-peer application 302 issues an erase directive 332 over the network 310. The second peer-to-peer application 314 receives the erase directive 332 and translates the directive 332 into an erase ink function 334 that is sent to the user interface 318. The user interface 318 erases the visual indicia 340 from the document 320 in response to receiving the erase ink function 334.

In another embodiment, when the peer-to-peer application 302 receives the "Pen as Pointer" input 322, the peer-to-peer application 302 changes the "type" of ink used on the document 306 to a "disappearing ink" type. The peer-to-peer application 302 then receives an ink input 324 in "disappearing ink." The peer-to-peer application 302 broadcasts a mark directive 328 that provides data about the visual indicia 338, which is in "disappearing ink." Upon receiving the mark directive 328, the peer-to-peer application 314 sends a draw ink function 330 to the user interface 318 to generate the visual indicia 340 on the document 320. In addition, the peer-to-peer application 314 starts a timer 336 to time for a predetermined period of time. In response to the predetermined period of time having elapsed on the timer 336, the peer-to-peer application 314 sends an erase ink function 334 to the user interface 318 to erase the visual indicia 340 from the document 320. Thus, in this embodiment, the first peer-to-peer application 302 does not need to send an erase directive 332 to have the visual indicia 338 and/or 340 automatically disappear. Rather, the "disappearing ink" type data transmitted with the mark directive 328 provide the data required for the peer-to-peer application to know to automatically erase the visual indicia 340 after the period of time. In embodiments of the invention, data within the mark directive 328 also provides the duration for the period of time to wait before erasing the visual indicia 340.

It should be noted that the erase function 334 for document 320 may not occur at the same moment in time as the erase function on document 306. The difference in time may occur because of time differences between the sending of the ink command 324 and the draw ink command 330. The time differences are attributable to the time required to send the mark directive 328 to the peer-to-peer application 314. While there may be a time difference in some embodiments, the disappearing ink function appears, to each user, to function independently on each user interface 318 and/or 304.

In another embodiment, the peer-to-peer application 314 receives an erase ink directive 334 from the user interface 318 before the peer-to-peer application 314 either receives an erase directive 332 or the clock 336 reaches the period of time. In this embodiment, the peer-to-peer application 314 can immediately erase one or more of the visual indicia 340 in the document 320. Allowing the user to erase the visual indicia 340 before the expiration of the period of time provides the user with control over the clutter on the user interface 318.

A user may enter two or more visual indicia into a document 306. In embodiments of the present invention, each visual indicia starts a new clock 326 or 336 and either creates a new erase directive 332 and/or a new erase ink function 334. Thus, the documents 306 and 320 can display multiple visual indicia, which all disappear at different times. In other embodiments, the system 300 works in reverse with the peer-to-peer application 314 also sending mark directives 328 and/or erase directives 332 to the other peer-to-peer application 302. Thus, a second user may enter a "pen as pointer" input 342 into the user interface 318. Then, any edits to the document 320 create visual indicia 340 that are broadcast to the first peer-to-peer application 302.

Figure 4:
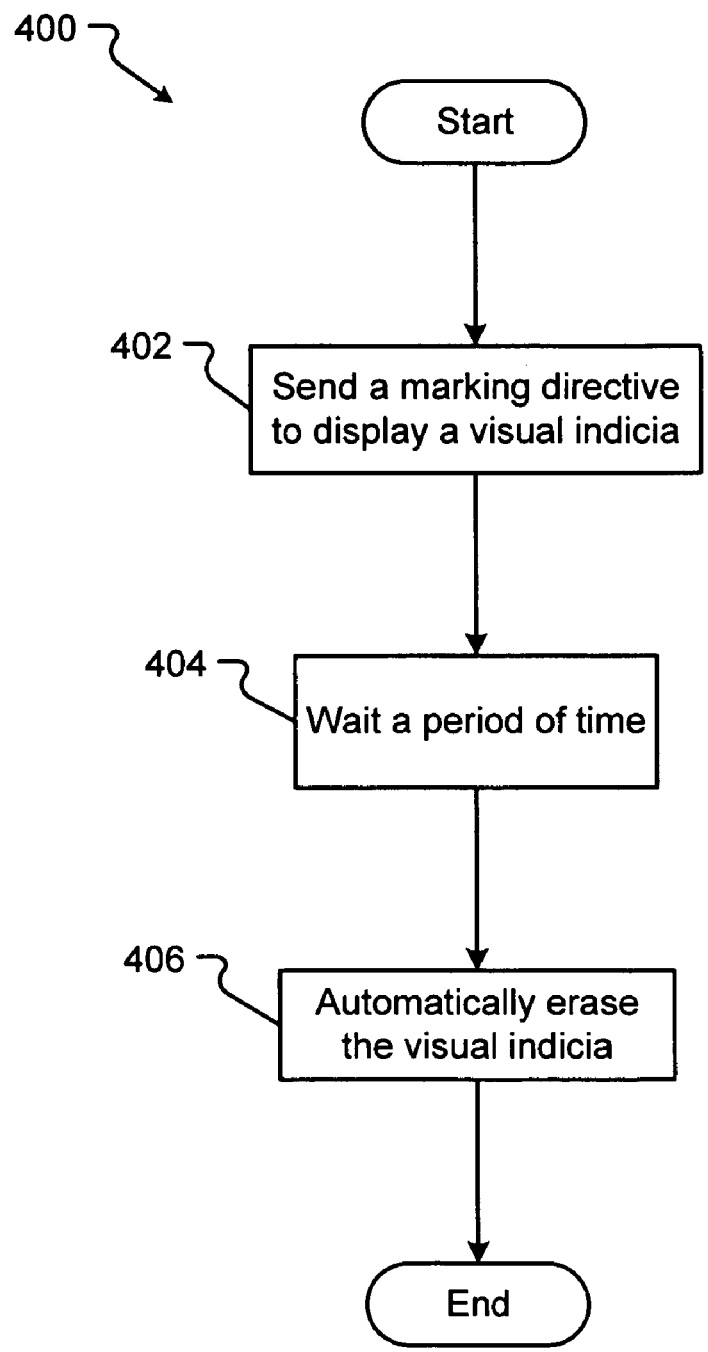
FIG. 4 is a flow diagram of an exemplary embodiment of a method for generating a temporary visual indicia according to the present invention.

In some embodiments, the mark directive 328 and the erase directive 332 receive a higher or highest priority for transmission over the network 310. The network 310 may be transmitting several communications between the peer-to-peer applications 302 and 314. Each communication can have a priority for transmission. If a communication has a low priority, the lower priority communication may wait a period of time before the network 310 transmits the lower priority communication as other higher priority communications are first sent over the network 310. However, the mark directive 328 and the erase directive 332 may be time sensitive. In other words, when a mark 338 is placed on document 306, the mark 340 needs to appear on document 320 relatively quickly to ensure that the users' conversation is not stilted waiting for the appearance of the marks 338 and/or 340. A delay of 10 seconds may be too long in some situations, while a delay of 1 minute may be appropriate in other situations. Regardless, the network 310 can assign a higher or highest priority for transmission to the mark directive 328 or erase directive 332 to ensure there is not an unnecessary time delay between the appearance of the marks 338 and 340 on the documents 306 and 320. An exemplary method 400 for generating temporary visual indicia is shown in FIG. 4. First, send operation 402 sends a marking directive, such as mark directive 314, to display visual indicia, such as visual indicia 138. In one embodiment, a peer-to-peer application, such as application 302, broadcasts a mark directive over a network, such as network 310, to one or more other peer-to-peer applications, such as application 314. In a further embodiment, the marking directive directs the connected peer-to-peer applications to render a visual indicia on a document, such as document 306 and/or 320, displayed on a display device, such as display device 304 and/or 318. Then, wait operation 404 waits a period of time. In embodiments, the peer-to-peer application starts a clock, such as clock 326 and/or 336, to count for a period of time. The peer-to-peer application then waits for the clock to reach the period of time.

In response to the predetermined period of time having elapsed, erase operation 406 automatically erases the visual indicia. In one embodiment, the peer-to-peer application broadcasts an erase directive, such as erase directive 332, to direct the erasure of the visual indicia. In another embodiment, the peer-to-peer application sends an erase ink function, such function 334, to erase the visual indicia without receiving an erase directive. In all embodiments, no user input is required to erase the visual indicia after sending the marking directive. However, in some embodiments, the user may erase the visual indicia before the visual indicia are automatically erased.

Figure 5:
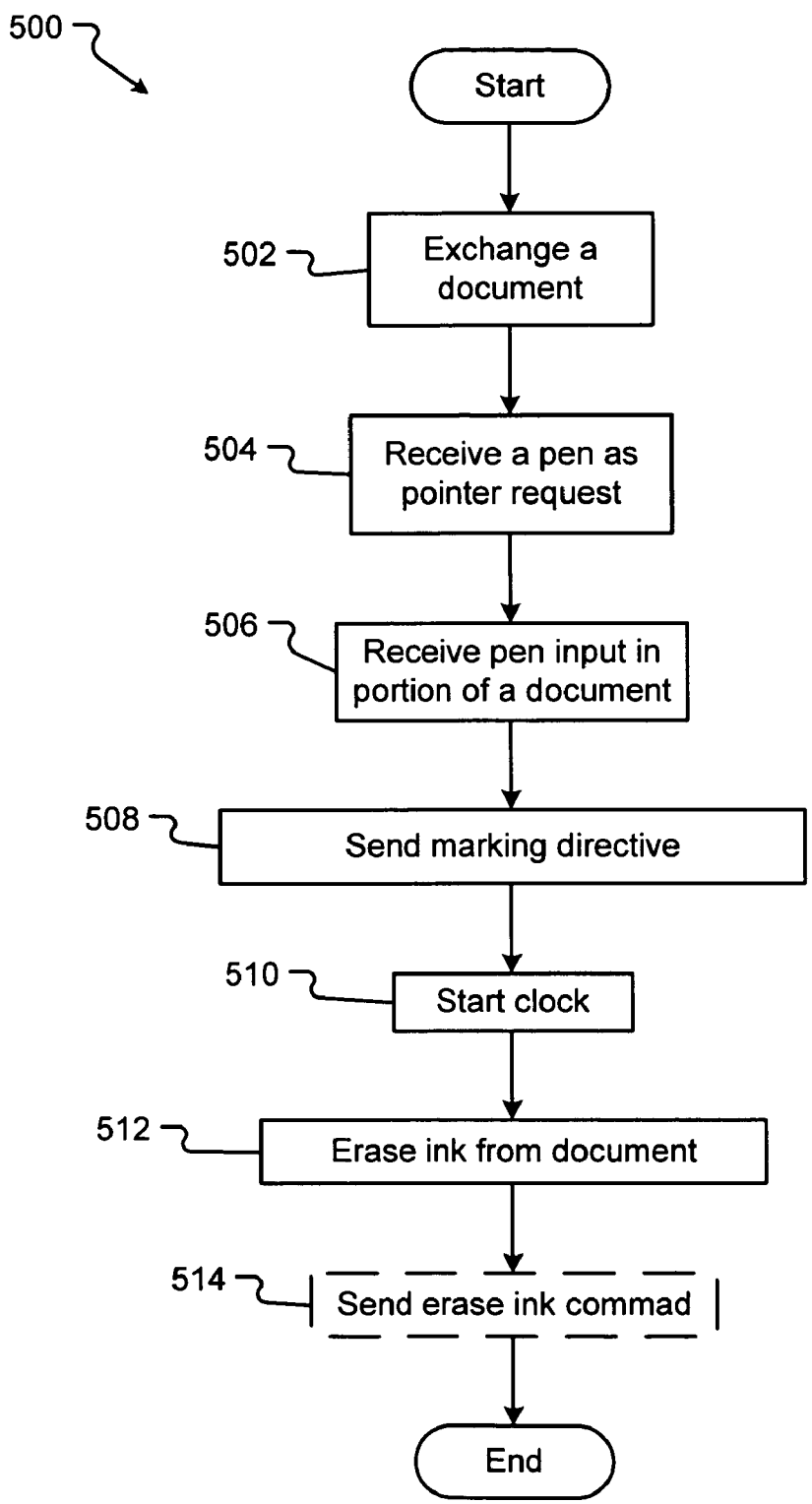
FIG. 5 is a flow diagram of another exemplary embodiment of a method for generating a temporary visual indicia according to the present invention.

A further embodiment of a method 500 for generating temporary visual indicia is shown in FIG. 5. In embodiments, exchange operation 502 exchanges a document, such as document 306. In one embodiment, a peer-to-peer application, such as application 302, sends document data, such as document 312, to at least one other peer-to-peer application, such as application 314. The other peer-to-peer applications send the document to a user interface, such as user interface 318, to display the document. Then, receive operation 504 receives a "pen as pointer" input, such as input 322. In one embodiment, the user selects a pen as pointer control, such as control 132, with a cursor, such as cursor 144. The pen as pointer input informs the peer-to-peer application that the input that follows is in "disappearing ink."

Receive operation 506 then receives a pen input, such as input 138, in a portion of the document. In one embodiment, the user selects a drawing function in the user interface and uses the cursor to draw "pen like" visual indicia on the document. Then, send operation 508 sends a marking directive, such as marking directive 328, to the other peer-to-peer applications. In embodiments, the other peer-to-peer applications translate the marking directive into a draw ink function, such as function 330, and render visual indicia, such as visual indicia 138, on the document rendered in the display device, such as computer system 108. In response to sending the marking directive, receiving the marking directive, or receiving the pen input, start operation 510 starts a clock, such as clock 326 and/or 336. The clock counts for a predetermined period of time. In one embodiment, each peer-to-peer application starts its own clock. In another embodiment, only the peer-to-peer application that sent the marking directive starts a clock.

In response to the clock counting for the period of time, erase operation 512 automatically erases the visual indicia from the document. In embodiments of the present invention, each peer-to-peer application erases the pen ink from the document. In another embodiment, optional send operation 514 sends an erase directive, such as erase directive 332. In one embodiment, the peer-to-peer application sends an erase directive to the other peer-to-peer applications. The other peer-to-peer applications translate the erase directive into an erase ink function, such as function 334, that deletes the visual indicia from the document.

The present invention relates to software components, classes, and object for generating temporary visual indicia. A Folder class provides objects for managing data in a peer-to-peer application. Under the Folder class, a Section class provides objects for managing certain types of documents, such as text document, notes, spreadsheets, etc. Under the Section class, a Pages class provides objects to manage instantiations of particular documents of a certain document type managed by the Section class. Pages objects may be text objects, image objects, etc. One object in the Pages class is an Ink object. Ink objects have a property for type of ink. If the ink is to be automatically erased, the ink object is a PointerInk object and has a property set that the ink should be automatically erased. When the PointerInk object is sent to another peer-to-peer application in response to a user interface action, the sending peer-to-peer application reads the property, starts the clock, and sends the marking directive. In response to the clock reaching the predetermined period of time, the peer-to-peer application sends an erase directive to delete the PointerInk object.

Although the present invention has been described in language specific to structural features, methodological acts, and computer-readable media containing such acts, it is to be understood that the present invention defined in the appended claims is not necessarily limited to the specific structure, acts, or media described. One skilled in the art will recognize other embodiments or improvements that are within the scope and spirit of the present invention. Therefore, the specific structure, acts, or media are disclosed as exemplary embodiments of implementing the claimed invention. The invention is defined by the appended claims.

What is claimed is:

1. A method, executed by a computer system having at least one memory and at least one processing unit, for temporarily marking a portion of a document, the method comprising:
   connecting a first computer and a second computer via a peer-to-peer application over a network, wherein the first computer comprises a first display window and the second computer comprises a second display window;
   establishing a meeting between the first computer and the second computer;
   sending the document from the first computer to the second computer;
   displaying the document simultaneously on the first display window and on the second display window;
   sending a first marking directive from the first computer that creates a first visual indicia on the document;
   displaying the first visual indicia on the document in the first display window and in the second display window, wherein a clock maintains a first count for a predetermined amount of time after creating the first visual indicia in response to the first marking directive;
   sending a second marking directive from the second computer that creates a second visual indicia on the document;
   displaying the second visual indicia on the document in the first display window and in the second display window, wherein the clock maintains a second count for the predetermined amount of time after creating the second visual indicia in response to the second marking directive, wherein the first visual indicia and the second visual indicia are created at different times; and
   automatically erasing the first visual indicia and the second visual indicia on the document displayed in the first display window and in the second display window in response to the clock reaching the predetermined amount of time for the first count and for the second count, wherein the first visual indicia and the second visual indicia are automatically erased at different times.

2. The method defined in claim 1, further comprising:
   receiving a pen as pointer directive; and
   receiving edits to the document from each of the first computer and the second computer,
   wherein the edits correspond to the first and second marking directives.

3. The method defined in claim 1, further comprising:
   in response to receiving the first marking directive, starting the first count of the clock for the predetermined period of time; and
   in response to the clock reaching the first count for the predetermined period of time, sending an erase directive to erase the first visual indicia on the document being viewed in the first display window of the first computer and in the second display window of the second computer.

4. The method defined in claim 3, wherein the first marking directive includes data that specifies the first visual indicia as disappearing ink, which is to be automatically erased.

5. The method defined in claim 1, further comprising:
   receiving an erase input to erase the first visual indicia before the predetermined period of time expires; and
   erasing the first visual indicia before the predetermined period of time expires.

6. In a computer system having a graphical user interface including a display and a user interface selection device, a method of providing temporary visual indicia on a document, comprising the steps of:

sending the document from a first computer having a first display window to a second computer having a second display window via a peer-to-peer application over a network;

displaying the document simultaneously on the first display window and the second display window;

receiving a first edit to the document from the first computer that creates a first visual indicia;

displaying the first visual indicia in the document on the first display window and on the second display window, wherein a clock maintains a first count for a predetermined period of time after creating the first visual indicia in response to the first edit;

receiving a second edit to the document from the second computer that creates a second visual indicia;

displaying the second visual indicia in the document on the first display window and on the second display window, wherein the clock maintains a second count for the predetermined period of time after creating the second visual indicia in response to the second edit, wherein the first visual indicia and the second visual indicia are created at different times;

automatically erasing the first visual indicia and the second visual indicia in the document displayed on the first display window and on the second display window in response to the clock reaching the predetermined amount of time for the first count and for the second count, wherein the first visual indicia and the second visual indicia are automatically erased at different times.

7. The method as defined in claim 6, further comprising: receiving a pen as pointer input.

8. The method as defined in claim 6, further comprising:
in response to receiving the first edit, starting the first count of the clock for the predetermined period of time; and
in response to the clock reaching the first count for the predetermined period of time, sending an erase function to automatically erase the first visual indicia in the document.

9. A computer storage medium having computer-executable instructions for executing computer executable components for generating a temporary visual indicia on a document displayed at a first computer system and a second computer system, the components comprising:

a connecting component that connects the first computer system and the second computer system via a peer-to-peer application running over a network;

a meeting component that establishes a meeting between the first computer system and the second computer system;

a directive component that issues a directive from the first computer system to the second computer system to share the document;

a sending component that sends the document from the first computer system to the second computer system;

a display component that displays the document simultaneously on a first display device connected to the first computer system and a second display device connected to the second computer system;

a marking component that:
produces a first marking directive upon input by a first user and sends the first marking directive to the first computer system and to the second computer system to create a first visual indicia displayed in the document on the first computer system and the second computer system; and produces a second marking directive upon input by a second user and sends the second marking directive to the first computer system and to the second computer system to create a second visual indicia displayed in the document on the first computer system and the second computer system;

a clock component that maintains a first count for a predetermined period of time after creating the first visual indicia in response to the first marking directive and a second count for the predetermined period of time after creating the second visual indicia in response to the second marking directive, wherein the first visual indicia and the second visual indicia are created at different times;

an erasing component that automatically erases the first visual indicia and the second visual indicia in the document displayed on the first computer system and the second computer system in response to the clock component reaching the predetermined period of time for the first count and for the second count, wherein the first visual indicia and the second visual indicia are automatically erased at different times.

10. The computer storage medium defined in claim 9, wherein the marking component receives a pen as pointer directive and receives edits to the document from each of the first computer system and the second computer system wherein the edits correspond to the first and second marking directives.

11. The computer storage medium defined in claim 9, wherein the clock component, in response to the marking component sending the first marking directive, starts the first count for the predetermined period of time.

12. The computer storage medium defined in claim 9, wherein the erase component, in response to the clock reaching the predetermined period of time for the first count, sends an erase directive to erase the first visual indicia in the document displayed on the first and second display devices.

13. The computer storage medium defined in claim 9, wherein the first marking directive includes data that specifies the first visual indicia is disappearing ink, which is to be automatically erased.

14. The computer storage medium defined in claim 9, wherein the erase component receives an erase input from a user interface to erase the first visual indicia before the predetermined period of time expires, and, in response to the erase input, the erase component erases the first visual indicia before the predetermined period of time expires.

15. The computer storage medium in claim 9, wherein the mark component receives a pen as pointer input.

16. The computer storage medium defined in claim 9, wherein the first computer system comprises the mark component, the clock component, and the erase component and sends the first visual indicia to the second computer system.

* * * * *